United States Patent [19]

Shea et al.

[11] 3,891,769

[45] June 24, 1975

[54] PSYCHOTHERAPEUTIC METHODS EMPLOYING THIOUREAS

[75] Inventors: Philip J. Shea; Abdulmuniem H. Abdallah, both of Midland, Mich.

[73] Assignee: The Dow Chemical Company, Midland, Mich.

[22] Filed: Feb. 1, 1974

[21] Appl. No.: 438,926

[52] U.S. Cl. .............................................. 424/322
[51] Int. Cl. ........................................... A61u 27/00
[58] Field of Search ................................... 424/322

[56] References Cited
UNITED STATES PATENTS
3,767,816  10/1973   Moss et al........................... 424/322

*Primary Examiner*—Stanley J. Friedman
*Attorney, Agent, or Firm*—Gary D. Street

[57] ABSTRACT

Certain thioureas of the class of 1-aryl-3-(2-hydroxyethyl)thioureas are shown to exhibit significant tranquillizing and antidepressant activity.

42 Claims, No Drawings

PSYCHOTHERAPEUTIC METHODS EMPLOYING THIOUREAS

BACKGROUND OF THE INVENTION

The present invention relates to the pharmaceutical field and more particularly to methods for treating mammals utilizing as active agents certain compounds from the class known as 1-aryl-3-(2-hydroxyethyl)thioureas.

The preparation of various 1-aryl-3-(2-hydroxyethyl)thioureas is disclosed in the art. Typically, such compounds are commonly prepared by the addition of ethanolamine to an aryl isothiocyanate. For example, the preparation of 1-(2,4-dimethylphenyl)-(2-hydroxyethyl)thiourea and related compounds is disclosed in U.S. Letters Patent No. 3,767,816. Compounds wherein the aryl moiety bears a methoxy substituent are similarly prepared by employing a corresponding methoxy substituted aryl isothiocyante reactant. The above patent reference teaches the use of such compounds of diuretic agents. French Pat. No. 1,356,908 also disclosed such structures only as intermediates for the preparation of 2-(arylamino)thiazolines. Schroeder in Chem. Reviews 55, 183–189 (1955), discusses the biological properties of many thiourea compounds. Specific properties discussed include antitubercular, antithyroid, hypnotic, anesthetic, anthelmintic, antibactrial, antiphenoloxidase, insecticidal and rodenticidal properties. Psychopharmacological properties are not discussed.

Depression is a psychiatric condition which may be diagnosed as a symptom, a syndrome, or a disease entity, depending upon the clinical situation of the subject. While the predominant symptoms of depression are hypochondria, anorexia, insomnia, anergia and pessimism, it is not uncommon for mammals suffering from depression to be anxious and/or agitated. Such mammals are often treated with a combination of antidepressants and tranquilizers. However, it would be highly desirable to administer an antidepressant agent which also exhibits antianxiety and anti-agressive activity, i.e., acts as a tranquilizer. The present invention is particularly concerned with the use of certain compounds which provide such activities.

SUMMARY OF THE INVENTION

The essential feature of this discovery is the antidepressant and tranquilizing utility of a class of thioureas of the generic formula:

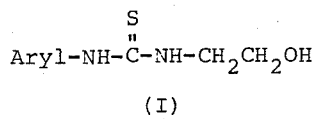

(I)

wherein aryl represents 2,4-dimethylphenyl, 2,4-dimethylbenzyl, 4-methoxy-2-methylphenyl, 2,4-dimethoxyphenyl, 2-methylphenyl, 3,5-dimethylphenyl, 2,5-dimethylphenyl, 2,6-dimethylphenyl or 2,4,6-trimethylphenyl. The foregoing compounds are, for convenience, hereinafter referred to as "thioureas".

DESCRIPTION OF THE PREFERRED EMBODIMENTS

The thiourea compounds employed as antidepressants or tranquilizers in the methods of the present invention are administered internally, i.e., orally or parenterally. Such compounds can be formulated into various pharmaceutical dosage forms such as tablets, capsules, solutions, suspensions, pills and the like, for immediate or sustained release, by combining the active compounds with suitable pharmaceutically acceptable carriers or diluents according to methods well known in the art. Such dosage forms may additionally include excipients, binders, fillers, flavoring and sweetening agents and other therapeutically inert ingredients necessary in the formulation of the desired pharmaceutical preparation.

Preferred thioureas employed in the methods of the present invention include those wherein aryl is selected from the group consisting of 2,4-dimethylphenyl, 2-methylphenyl, 2,4-dimethylbenzyl, 3,5-dimethylphenyl, 2,5-dimethylphenyl and 2,4,6-trimethylphenyl. Another preferred class of compounds employed in the methods of the present invention include those wherein aryl represents 2-methyl-4-methoxyphenyl or 2,4-dimethoxyphenyl. Compounds wherein aryl represents 2-methylphenyl, 2,4-dimethylphenyl, 3,5-dimethylphenyl or 2,5-dimethylphenyl constitute another preferred class of compounds. A preferred compound of the present invention is 1-(2,4-dimethylphenyl)-3-(2-hydroxyethyl)-thiourea.

The thioureas of this invention provide a new class of effective antidepressants. This is surprising and unexpected since many compounds of closely related structure exhibit either insignificant or no antidepressant activity whatsoever. The thioureas of the present invention offer further advantages in view of the fact that they are not monamine oxidase inhibitors and have a large therapeutic index, the $LD_{50}$ of many of the thioureas being greater than 562 mg/kg (ip). The antidepressant properties of the compounds employed in the methods of the present invention are determined by measuring their ability to counteract ptosis induced in animals by the intraperitoneal injection of reserpine. Graded doses of the active compounds of this invention are administered intraperetoneally and orally to groups of five mice each, followed thirty minutes later by an intraperitoneal injection of reserpine in an amount which is known to induce ptosis in mice. Similar groups of control mice are administered only reserpine. Forty-five minutes after the administration of reserpine, the presence or absence of ptosis is noted. The percent inhibition of ptosis is noted and the median effective dose ($ED_{50}$) of each test ingredient which protected 50 percent of the test mice from reserpine-induced ptosis was calculated. In such operations, the median $ED_{50}$'s were established for the compounds of the formula:

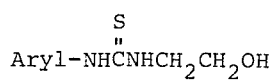

as set forth in the following Table.

TABLE I

| Cmpd. No. | Aryl | $ED_{50}$ mg/kg** i.p. | oral |
|---|---|---|---|
| 1. | 2,4-dimethylphenyl | 14.5 | 8.8 |
| 2. | 2,4-dimethylbenzyl | 11.0 | 6.8 |
| 3. | 4-methoxy-2-methyl | 10.0 | 16.2 |

TABLE I-Continued

| Cmpd. No. | Aryl | ED$_{50}$ mg/kg** i.p. | oral |
|---|---|---|---|
| 4. | 2,4-dimethoxyphenyl | 38.0 | — |
| 5. | 2-methylphenyl | 5.5 | 5.8 |
| 6. | 2,5-dimethylphenyl | 1.3 | — |
| 7. | 3,5-dimethylphenyl | 15.0 | 10.8 |
| 8. | 2,4,6-trimethylphenyl | 17.8 | — |
| 9. | 2,6-dimethylphenyl | 1.8 | — |
| 10. | Imipramine* | 15.0 | 14.0 |
| 11. | Doxepin* | 27.0 | 27.0 |

*Reference Drugs
**Calculated by the Method of Horn, Biometry 12, 311 (1956) or Litchfield and Wilcoxon, J. P. E. T., Vol. 96, No. 2 (1949).

The method of treating depression in accordance with this invention comprises administering internally to an animal a compound as represented by Formula I, usually combined with a pharmaceutical excepient or carrier, in an amount sufficient to produce to antidepressant effect. Preferably, the compounds are administered orally. Advantageously, equal doses will be administered from one to six times daily.

The dosage required to achieve antidepressant activity in the animal will vary with various factors such as the species of animals, general health and tolerances of the animal, weight, sex and age of the animal, the nature and severity of the disease being treated and the like. Additionally, it is to be noted that the exact dosage of each individual compound employed in similar situations will vary. Generally, a total daily dosage would be in the range of from about 0.5 to about 100.0 milligrams or more per kilogram of body weight, usually from 1.0 to about 25.0 milligrams per kilogram of body weight.

In addition to their antidepressant activity, it has been discovered that the thioureas of the present invention exhibit activity as tranquilizers when administered to animals. Thus, the present invention also embodies methods for tranquilizing a mammal susceptible to or suffering from anxiety, restlessness, agitation or the like. Certain of the thioureas also exhibit anti-aggressive activity and are thus useful in methods for inhibiting aggressive behavior in mammals, said methods constituting an additional embodiment of the present invention. The exact dosage required for such uses will depend upon various factors as discussed hereinabove. Generally, dosage rates within the ranges stated hereinabove are employed. While the thiourea compounds can be employed for the singular treatment of any of the foregoing conditions, the combination of antidepressant and tranquilizing activity renders these compounds possessing each such utility particularly useful in methods for treating depression accompanied by states of anxiety and/or agitation. Moreover, such combined utility is especially useful in situations where depression is complicated by states of anxiety and/or agitation. For all such uses, the 1-(2,4-dimethylphenyl)-3-(2-hydroxyethyl)thiourea compound is preferred. A particular class of compounds preferred for use as anti-aggressive agents includes those wherein the aryl group of Formula I is selected from the group consisting of 2,4-dimethylphenyl, 2,4-dimethylbenzyl, 3,5-dimethylphenyl, 2-methylphenyl and 4-methoxy-2-methylphenyl.

The tranquilizing activity of certain thioureas of the present invention is indicated by their prolongation of barbiturate-induced sedation in small rodents. In such operations, separate groups of mice received a dosage of each of the thiourea test compounds (Nos. 1–9 of Table I) at a rate of 60 mg/kg one hour before intraperitoneal administration of hexobarbital at a dosage rate of 100 milligrams per kilogram. Separate groups of untreated mice were similarly injected with hexobarbital at a dosage rate of 100 milligrams per kilogram to serve as checks. The hexobarbital injections induced sleep in the mice. The mice were then placed on their backs and the period of time until each mouse turned over and righted itself was recorded as sleep time. The ratio of the average sleep time for the treated mice to that of the untreated mice is expressed as hexabarbital sleep time ratio as follows:

| Aryl No.* | Hexobarbital Sleep Ratio |
|---|---|
| 1. | 2.60 |
| 3. | 3.08 |
| 4. | 1.56 |
| 5. | 1.40 |
| 6. | 1.41 |
| 7. | 4.40 |
| 8. | >2.01 |
| 9. | 3.50 |

*See Table I for compound designation.

The anti-aggressive activity of certain thiourea compounds was determined using the following "isolation-induced agression" test procedure.

Agression was established in naive male mice by isolating them in individual cages for a period of four weeks according to Barnett et al., Psychopharmacologia 19, 359–365 (1971). After the four week period, mice were paired together on three separate test days within a one-week period to establish the presence or absence of aggression, with one mouse being maintained in the home cage with the other mouse being the intruder. If the mice fought within three minutes of contact, the intruder was immediately removed and the presence of aggression recorded. If the pair of mice fought on two or more of the test sessions, they were used in studies with selected thiourea test compounds.

In such test operations, each test ingredient was administered at various dosage rates to five pairs of mice while 5 other pairs of mice received saline solution and served as controls. Thirty minutes after the intraperitoneal injection, the intruder was placed in the home cage of another and the pressure of aggression observed during a three minute period. When aggression was established, the intruder was immediately removed so that the dominance of one mouse over the other was not established. The effective dose (ED$_{50}$) of test ingredient which prevented aggression in 50% of the mice of a test group was calculated according to the method of Horn set forth hereinabove.

In such operations, each of the 1-(2,4-dimethylphenyl)-3-(2-hydroxyethyl)thiourea, 1-(2,4-dimethylbenzyl)-3-(2-hydroxyethyl)thiourea, 1-(2-methylphenyl)-3-(2-hydroxyethyl)thiourea and 1-(4-methoxy-2-methylphenyl)-3-(2-hydroxyethyl)thiourea test ingredients were found to have an ED$_{50}$ of 5.0; 28.0; 15.0 and 21.5 mg/kg, respectively.

The anti-aggressive activity of certain thiourea compounds was also established by electric shock-induced aggression methods. In such methods, mice are given an intraperitoneal injection of the active test ingredient and thirty minutes later, a pair of treated mice is placed under an inverted beaker and subjected to an electric shock via a floor grid for a period of two minutes. The mean number of animals fighting in the drug-treated group as compared to the number fighting in a saline-treated control group was determined. In a representative operation, the $ED_{50}$ (the dose of test compound which renders 50% of the animals non-aggressive) for 1-(2,4-dimethylphenyl)-3-(2-hydroxyethyl)thiourea was found to be approximately 31.0 mg/kg.

The depressant activity of representative thiourea compounds of the invention was also determined using the following "TSMA" (total spontaneous motor activity) test procedure.

Individual male mice were placed in a plastic container for thirty minutes for acclimatization and the container then placed on top of a sensor recorder. The movements (TSMA) of the mice were "counted" during the thirty minute period. Various dosage rates of a selected test ingredient were then administered intraperitonically to groups of 10 mice each while similar test groups were injected with saline to serve as control checks. Following treatment, the mice were returned to their containers and the TSMA again recorded for 30, 60 and 90 minutes after the injection. Counts of the treated groups were compared with the counts of the saline-treated control groups according to the Mann-Whitney procedure (See SoKal & Rohlf, *Biometry*, 393 (1969 ed). In such operations, significant reductions in TSMA mean accumulative counts were obtained in mice treated with dosage rates of from about 10 to about 46 mg/kg of each of the 1-(2,4-dimethylphenyl)-3-(2-hydroxyethyl)thiourea, 1-(2,4-dimethylbenzyl)-3-(2-hydroxyethyl)thiourea, 1-(3,5-dimethylphenyl)-3-(2-hydroxyethyl)thiourea, 1-(2-methylphenyl)-3-(2-hydroxyethyl)thiourea and 1-(4-methoxy-2-methylphenyl)-3-(2-hydroxyethyl)thiourea.

In additional representative operations, the effect of intraperitoneal administration of 1-(2,4-dimethylphenyl)-3-(2-hydroxyethyl)thiourea on the behavior of aggressive monkeys was studies. The behavior of the monkeys with respect to sociability, contentment, excitement and defensive and aggressive hostility was observed and scored both pre- and post-treatment of the active test ingredient. At dosage rates of 5 mg/kg and higher, a marked calming or taming effect was observed, the behavioral scores indicating improved sociability and contentment and decreased excitement and hostility.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

That which is claimed is:

1. A method of treating depression which comprises: administering to a depressed mammal an effective amount of a compound of the formula:

wherein aryl represents 2,4-dimethylphenyl, 2,4-dimethylbenzyl, 4-methoxy-2-methylphenyl, 2,4-dimethoxyphenyl, 2-methylphenyl, 3,5-dimethylphenyl, 2,5-dimethylphenyl, 2,6-dimethylphenyl or 2,4,6-trimethylphenyl.

2. A method as in claim 1 wherein aryl is selected from the group consisting of 2,4-dimethylphenyl, 2-methylphenyl, 2,4-dimethylbenzyl, 3,5-dimethylphenyl, 2,5-dimethylphenyl and 2,4,6-trimethylphenyl.

3. A method as in claim 1 wherein aryl represents 2-methylphenyl, 2,4-dimethylphenyl, 3,5-dimethylphenyl or 2,5-dimethylphenyl.

4. A method as in claim 1, wherein said compound is 1-(2,4-dimethylphenyl)-3-(2-hydroxyethyl)thiourea.

5. A method as in claim 1, wherein said compound is 1-(2,4-dimethylbenzyl)-3-(2-hydroxyethyl)thiourea.

6. A method as in claim 1, wherein said compound is 1-(4-methoxy-2-methylphenyl)-3-(2-hydroxyethyl)thiourea.

7. A method as in claim 1, wherein said compound is 1-(2,4-dimethoxyphenyl)-3-(2-hydroxyethyl)thiourea.

8. A method as in claim 1, wherein said compound is 1-(2-methylphenyl)-3-(2-hydroxyethyl)thiourea.

9. A method as in claim 1, wherein said compound is 1-(3,5-dimethylphenyl)-3-(2-hydroxyethyl)thiourea.

10. A method as in claim 1, wherein said compound is 1-(2,5-dimethylphenyl)-3-(2-hydroxyethyl)thiourea.

11. A method as in claim 1, wherein said compound is 1-(2,6-dimethylphenyl)-3-(2-hydroxyethyl)thiourea.

12. A method as in claim 1, wherein said compound is 1-(2,4,6-trimethylphenyl)-3-(2-hydroxyethyl)thiourea.

13. The method of claim 1 wherein said mammal is also suffering from states of anxiety and/or agitation.

14. The method of claim 13 wherein aryl represents 2-methylphenyl, 2,4-dimethylphenyl, 3,5-dimethylphenyl or 2,5-dimethylphenyl.

15. The method of claim 13 wherein said compound is 1-(2,4-dimethylphenyl)-3-(2-hydroxyethyl)thiourea.

16. The method of claim 13 wherein said compound is 1-(2,4-dimethylbenzyl)-3-(2-hydroxyethyl)thiourea.

17. The method of claim 13 wherein said compound is 1-(4-methoxy-2-methylphenyl)-3-(2-hydroxyethyl)thiourea.

18. The method of claim 13 wherein said compound is 1-(2,4-dimethoxyphenyl)-3-(2-hydroxyethyl)thiourea.

19. The method of claim 13 wherein said compound is 1-(2-methylphenyl)-3-(2-hydroxyethyl)thiourea.

20. The method of claim 13 wherein said compound is 1-(3,5-dimethylphenyl)-3-(2-hydroxyethyl)thiourea.

21. The method of claim 13 wherein said compound is 1-(2,5-dimethylphenyl)-3-(2-hydroxyethyl)thiourea.

22. The method of claim 13 wherein said compound is 1-(2,6-dimethylphenyl)-3-(2-hydroxyethyl)thiourea.

23. The method of claim 13 wherein said compound is 1-(2,4,6-trimethylphenyl)-3-(2-hydroxyethyl)thiourea.

24. A method for effecting tranquilization in a mammal which comprises administering to said mammal an effective amount of a compound of the formula:

wherein aryl represents 2,4-dimethylphenyl, 2,4-dimethylbenzyl, 4-methoxy-2-methylphenyl, 2,4-dimethoxyphenyl, 2-methylphenyl, 3,5-dimethylphenyl, 2,5-dimethylphenyl, 2,6-dimethylphenyl or 2,4,6-trimethylphenyl.

25. A method as in claim 24 wherein aryl is selected from the group consisting of 2,4-dimethylphenyl, 2-methylphenyl, 2,4-dimethylbenzyl, 3,5-dimethylphenyl, 2,5-dimethylphenyl and 2,4,6-trimethylphenyl.

26. A method as in claim 24 wherein aryl is 2-methylphenyl, 2,4-dimethylphenyl, 3,5-dimethylphenyl or 2,5-dimethylphenyl.

27. A method as in claim 24 wherein said compound is 1-(2,4-dimethylphenyl)-3-(2-hyroxyethyl)thiourea.

28. A method as in claim 24 wherein said compound is 1-(2,4-dimethylbenzyl)-3-(2-hydroxyethyl)thiourea.

29. A method as in claim 24 wherein said compound is 1-(4-methoxy-2-methylphenyl)-3-(2-hydroxyethyl)-thiourea.

30. A method as in claim 24 wherein said compound is 1-(2,4-dimethoxyphenyl)-3-(2-hydroxyethyl)thiourea.

31. A method as in claim 24 wherein said compound is 1-(2-methylphenyl)-3-(2-hydroxyethyl)thiourea.

32. A method as in claim 24 wherein said compound is 1-(3,5-dimethylphenyl)-3-(2-hydroxyethyl)thiourea.

33. A method as in claim 24 wherein said compound is 1-(2,5-dimethylphenyl)-3-(2-hydroxyethyl)thiourea.

34. A method as in claim 24 wherein said compound is 1-(2,6-dimethylphenyl)-3-(2-hydroxyethyl)thiourea.

35. A method as in claim 24 wherein said compound is 1-(2,4,6-trimethylphenyl)-3-(2-hydroxyethyl)thiourea.

36. A method of treating an agressive mammal which comprises administering to said mammal an effective amount of a compound

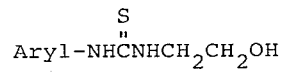

wherein aryl represents 2,4-dimethylphenyl, 2,4-dimethylbenzyl, 4-methoxy-2-methylphenyl, 2,4-dimethoxyphenyl, 2-methylphenyl, 3,5-dimethylphenyl, 2,5-dimethylphenyl, 2,6-dimethylphenyl or 2,4,6-trimethylphenyl.

37. A method as in claim 36 wherein aryl is selected from a group consisting of 2,4-dimethylphenyl, 2,4-dimethylbenzyl, 3,5-dimethylphenyl, 2-methylphenyl and 4-methoxy-2-methylphenyl.

38. A method as in claim 36 wherein the compound is 1-(2,4-dimethylphenyl)-3-(2-hydroxyethyl)thiourea.

39. A method as in claim 36 wherein the compound is 1-(2,4-dimethylbenzyl)-3-(2-hydroxyethyl)thiourea.

40. A method as in claim 36 wherein the compound is 1-(3,5-dimethylphenyl)-3-(2-hydroxyethyl)thiourea.

41. A method as in claim 36 wherein the compound is 1-(2-methylphenyl)-3-(2-hydroxyethyl)thiourea.

42. A method as in claim 36 wherein the compound is 1-(4-methoxy-2-methylphenyl)-3-(2-hydroxyethyl)-thiourea.

* * * * *